May 17, 1927.
F. S. HYATT
1,629,166
SOCKET AND PLUG CONNECTION
Filed April 23, 1926
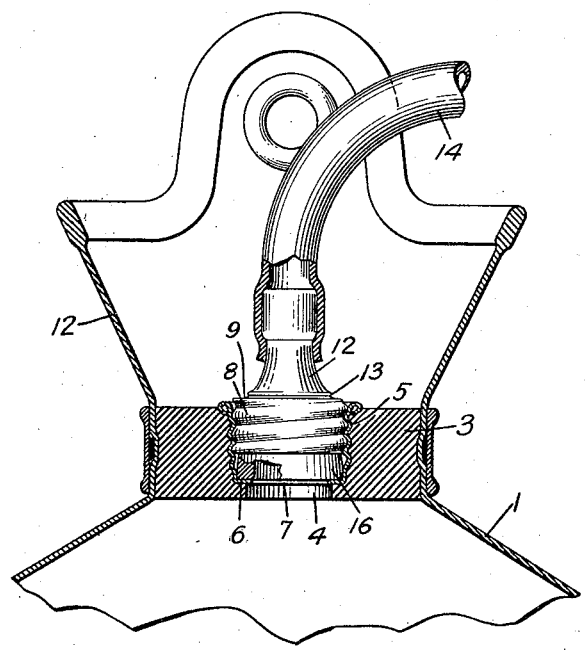
Fig. 1,
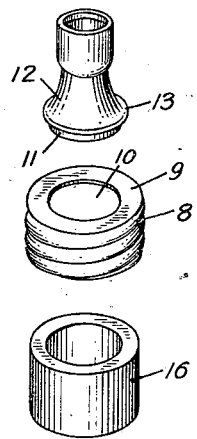
Fig. 2,
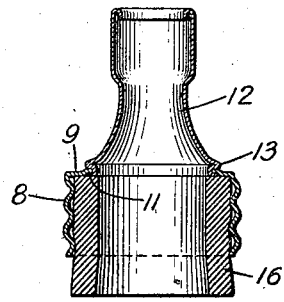
Fig. 3.
INVENTOR
Frank S. Hyatt,
BY
Townsend+Decker
ATTORNEYS Patented May 17, 1927.

1,629,166

UNITED STATES PATENT OFFICE.

FRANK S. HYATT, OF BROOKLYN, NEW YORK.

SOCKET AND PLUG CONNECTION.

Application filed April 23, 1926. Serial No. 104,009.

This invention relates generally to liquid containers having a socket-like outlet opening such as the ordinary hot-water bottle.

The principal object of the invention is to provide a simple, quickly detachable and leak-proof connection for a container of the character described which preferably is adapted to receive a flexible hose or tube whereby the contents of the container may be run off at will.

Other and further objects and advantages of the invention will appear from the subjoined description taken in connection with the accompanying drawing in which:

Fig. 1 is a side elevation (partly in section) of the invention as applied to a hot-water bottle.

Fig. 2 is a perspective view of three of the parts of the connection of the invention.

Fig. 3 is a section taken through the same three parts showing them in assembled position.

Referring in detail to the drawing:

The body or bag portion of a hot-water bottle is indicated at 1 and is supplied with a mouth 2 and a head 3 having an opening 4 therein receiving a screw-threaded socket 5 preferably constructed of sheet metal, the base 6 of which constitutes an annular flange forming the wall of an opening 7.

8 indicates the body of a sheet-metal screw-threaded plug open at its lower end, said body being adapted to be screwed within the socket 5. The upper wall of said plug constitutes an inwardly-flaring annular flange 9 providing the wall of an opening 10. Said opening 10 receives the flange 11 of a hollow sheet-metal nipple 12 said flange being riveted over the underside of the flange 9 as shown in Fig. 3. The nipple is also provided with a bead 13 seating on the flange 9 and acting as a stop to prevent the nipple from being drawn through the opening 10. The nipple is somewhat restricted in size at its upper end and is adapted to frictionally and removably receive a flexible hose or tube 14 thereon, a circumferential shoulder 15 being also formed on the nipple to prevent the hose or tube from slipping therefrom.

16 indicates a hollow gasket comprised of a compressible material such as rubber and normally and removably carried by the plug 8 and frictionally held therein with the upper edge of the gasket seating against the underside of the flange 9. The gasket is of such length that when it is positioned within the plug in the manner described, the lower end of the gasket extends an appreciable distance beyond the lower edge of the plug as shown in Fig. 3. When the plug is screwed tightly into the socket 5 the upper edge of the gasket 16 will be tightly compressed against the flange 9 of the plug and its lower edge will be tightly compressed against the flange 6 of the socket. The upper and lower circumferential edges of the gasket will also be expanded laterally somewhat with a slight portion of such edges overlapping the openings 10 and 7 respectively and a water-tight connection is thus provided between the container 1 and tube 14 whereby the contents of the container may be run through the gasket and nipple and through said tube.

It will be understood that instead of making the socket member and plug member screw-threaded, a bayonet joint could be provided between the two members and the same results accomplished.

What I claim as my invention is:—

The combination with a hollow screw-threaded socket member provided with a base constituting an annular flange which forms an opening, of a hollow screw-threaded plug member having an upper wall constituting an inwardly flaring annular flange providing the wall of an opening, a hollow nipple received within the opening in said upper wall and adapted to removably receive a tube thereon and a compressible annular hollow gasket frictionally held within the plug member with the upper edge thereof engaging the upper wall of said plug member and the lower edge thereof which normally extends beyond the lower end of said plug member adapted to engage the base of said socket member and the upper and lower edges of said gasket being compressed whereby portions thereof will extend inwardly within the opening in the base of said socket member and the opening in said plug member to produce a water-tight connection when said plug member is screwed tightly within said socket member.

Signed at Brooklyn in the county of Kings and State of New York this 21st day of April A. D., 1926.

FRANK S. HYATT.